US011495922B2

(12) United States Patent
Li et al.

(10) Patent No.: US 11,495,922 B2
(45) Date of Patent: Nov. 8, 2022

(54) MULTIFUNCTIONAL HIGH-VOLTAGE CONNECTOR AND BATTERY PRODUCT

(71) Applicant: Contemporary Amperex Technology Co., Limited, Fujian (CN)

(72) Inventors: Jianwei Li, Ningde (CN); Zhiqin Weng, Ningde (CN); Shengshen Ruan, Ningde (CN); Mingping Yang, Ningde (CN); Linggang Zhou, Ningde (CN); Libing Chan, Ningde (CN); Derong Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 118 days.

(21) Appl. No.: 17/132,174

(22) Filed: Dec. 23, 2020

(65) Prior Publication Data

US 2021/0111523 A1 Apr. 15, 2021

Related U.S. Application Data (63) Continuation of application No. PCT/CN2019/089054, filed on May 29, 2019.

(30) Foreign Application Priority Data

Aug. 15, 2018 (CN) .......................... 201821317407.7

(51) Int. Cl.
*H01R 13/703* (2006.01)
*H01M 50/531* (2021.01)
(Continued)

(52) U.S. Cl.
CPC ...... *H01R 13/7031* (2013.01); *H01M 50/244* (2021.01); *H01M 50/531* (2021.01);
(Continued)

(58) Field of Classification Search
CPC .... H01R 13/7031; H01R 13/68; H01R 31/08; H01R 13/11; H01R 13/504; H01R 13/639;
(Continued)

(56) References Cited

U.S. PATENT DOCUMENTS

| 9,509,096 | B2* | 11/2016 | Zhao | H01R 13/648 |
| 9,806,470 | B2* | 10/2017 | Okamoto | H01R 13/688 |
| 2018/0034013 | A1* | 2/2018 | Jeong | H01M 50/271 |

FOREIGN PATENT DOCUMENTS

| CN | 201490264 U | 5/2010 |
| CN | 205692891 U | 11/2016 |

(Continued)

OTHER PUBLICATIONS

Extended European Search Report dated Jul. 26, 2021, in connection with corresponding EP Application No. 19850025.8; 7 pages.
(Continued)

*Primary Examiner* — Oscar C Jimenez
*Assistant Examiner* — Paul D Baillargeon
(74) *Attorney, Agent, or Firm* — Maier & Maier, PLLC (57) ABSTRACT

A multifunctional high-voltage connector and a battery product are disclosed. The multifunctional high-voltage connector includes: a fuse, a socket, and a plug. The socket includes a base and a socket terminal. The plug includes a seat and a plug terminal. The base includes: a first main body portion; a first accommodating portion, protruding from the first main body portion; and a second accommodating portion, protruding from the first main body portion and provided to be spaced apart from the first accommodating portion. The fuse is accommodated in the first accommodating portion. At least a part of the socket terminal is (Continued)

accommodated in the second accommodating portion. The seat of the plug is inserted into the second accommodating portion of the base.

10 Claims, 8 Drawing Sheets

(51) Int. Cl.
  *H01M 50/244* (2021.01)
  *H01M 50/583* (2021.01)
  *H01R 13/68* (2011.01)
  *H01R 31/08* (2006.01)
  *H01R 13/11* (2006.01)
  *H01R 13/504* (2006.01)
  *H01R 13/639* (2006.01)

(52) U.S. Cl.
  CPC .......... *H01M 50/583* (2021.01); *H01R 13/68* (2013.01); *H01R 31/08* (2013.01); *H01M 2200/103* (2013.01); *H01R 13/11* (2013.01); *H01R 13/504* (2013.01); *H01R 13/639* (2013.01)

(58) Field of Classification Search
  CPC ............. H01M 50/531; H01M 50/244; H01M 50/583; H01M 2200/103
  See application file for complete search history.

(56) References Cited

FOREIGN PATENT DOCUMENTS

| | | |
|---|---|---|
| CN | 107681072 A | 2/2018 |
| CN | 208508145 U | 2/2019 |
| EP | 2 787 580 A1 | 10/2014 |
| EP | 3 279 972 A1 | 2/2018 |
| JP | 2017084490 A | 5/2017 |

OTHER PUBLICATIONS

Search Report dated Aug. 30, 2019 in corresponding International Application No. PCT/CN2019/089054; 9 pages.

* cited by examiner

MULTIFUNCTIONAL HIGH-VOLTAGE CONNECTOR AND BATTERY PRODUCT

CROSS-REFERENCE TO RELATED APPLICATIONS

This application is a national phase of International Application No. PCT/CN2019/089054, filed on May 29, 2019, which claims priority to Chinese Patent Application No. 201821317407.7, filed on Aug. 15, 2018. The disclosures of the aforementioned applications are hereby incorporated by reference in their entireties.

TECHNICAL FIELD

The present application relates to the field of connector technologies, in particular, to a multifunctional high-voltage connector and a battery product.

BACKGROUND

With the rapid development of the new energy industry, requirements for convenience of operation interfaces of battery products (such as battery packs or high-voltage boxes) continue to increase, and manual service disconnect (MSD) which are most frequently used are first considered. An MSD usually includes a fuse, a socket (including a base and a socket terminals) and a plug (including a seat and a plug terminal), and the MSD realizes on/off of high-voltage electric connection in a battery product by means of inserting the plug terminal into the socket terminal or disconnecting the plug terminal from the socket terminal.

For the traditional MSD, the fuse is integrated on the plug. As the battery product requires more and more current, in order to protect the battery in the battery product, the size of the fuse is also getting larger so that the size of the plug is larger and the weight is heavier, thus increasing difficulty of assembly between the socket and the plug.

SUMMARY

In view of the problem in the background, an objective of the present application is to provide a multifunctional high-voltage connector and a battery product, where the plug of the multifunctional high-voltage connector is small in size and light in weight, facilitating assembly between the plug and the socket; when it is applied to the battery product, assembly efficiency of the battery product could have been improved, and the battery product could have been easy to maintain.

In order to achieve the above objective, the present application provides a multifunctional high-voltage connector including: a fuse; a socket; and a plug. The socket includes: a base; and a socket terminal fixedly mounted to the base. The plug includes: a seat; and a plug terminal fixedly mounted to the seat. The base includes: a first main body portion; a first accommodating portion, protruding from the first main body portion in a thickness direction; and a second accommodating portion, protruding from the first main body portion in the thickness direction and provided to be spaced apart from the first accommodating portion in a length direction; the fuse is accommodated in the first accommodating portion, at least a part of the socket terminal is accommodated in the second accommodating portion, and the seat of the plug is inserted into the second accommodating portion of the base in such a way that the plug terminal is inserted into the socket terminal.

The socket terminal includes: a first terminal connected to the fuse; and a second terminal provided to be spaced apart from the first terminal; and the plug terminal includes: a third terminal inserted into the first terminal; and a fourth terminal inserted into the second terminal and connected to the third terminal.

The first terminal includes: a first holding portion embedded in the first main body portion of the base; a first inserting portion accommodated in the second accommodating portion; and a first connecting portion accommodated in the first accommodating portion and connected to the fuse. The second terminal includes: a second holding portion embedded in the first main body portion of the base; a second inserting portion accommodated in the second accommodating portion; and a second connecting portion extending from the first main body portion. The third terminal is inserted into the first inserting portion of the first terminal, and the fourth terminal is inserted into the second inserting portion of the second terminal.

The first inserting portion is accommodated in the third terminal, and the second inserting portion is accommodated in the fourth terminal. The third terminal includes a first elastic clamping portion for clamping the first inserting portion. The fourth terminal includes a second elastic clamping portion for clamping the second inserting portion.

The socket further includes a mounting shell. The mounting shell includes: a third main body portion; a first extending portion protruding from the third main body portion in the thickness direction; and a through hole running through the third main body portion in the thickness direction. The first accommodating portion of the base is accommodated in the first extending portion of the mounting shell, and the second accommodating portion extends from the mounting shell via the through hole.

The base further includes a third accommodating portion provided to be spaced apart from the first accommodating portion in the length direction. The multifunctional high-voltage connector further includes: a first adapter piece embedded in the first main body portion of the base, where a first end portion of the first adapter piece is located in the first accommodating portion and connected to the fuse, and a second end portion of the first adapter piece is located in the third accommodating portion; and a first wiring harness assembly fixed to the mounting shell of the socket, where a part of the first wiring harness assembly is located in the third accommodating portion of the base and connected to the second end portion of the first adapter piece.

The multifunctional high-voltage connector further includes: a second adapter piece; a mounting base mounted with the second adapter piece and fixed to the mounting shell; and a second wiring harness assembly fixed to the mounting shell and connected to the second adapter piece.

The mounting base includes: a fifth main body portion; and a fifth accommodating portion protruding from the fifth main body portion in the thickness direction T. The second adapter piece is embedded in the fifth main body portion, a third end portion of the second adapter piece is located in the fifth accommodating portion, and a fourth end portion of the second adapter piece is located outside the fifth main body portion. A part of the second wiring harness assembly is located in the fifth accommodating portion of the mounting base and connected to the third end portion of the second adapter piece.

The present application further provides a battery product including: a case body; a battery assembly; and the multifunctional high-voltage connector described above. The battery assembly is accommodated in the case body; the socket of the multifunctional high-voltage connector is fixedly mounted to the case body, and at least a part of the socket terminal of the socket extends into the case body and is connected to the battery assembly.

The battery assembly includes a first output pole and a second output pole. The multifunctional high-voltage connector further includes: a second adapter piece; and a second wiring harness assembly connected to the second adapter piece. The first output pole of the battery assembly is connected to the socket terminal, and the second output pole is connected to the second adapter piece.

The present application has the following beneficial effects:

In the multifunctional high-voltage connector, the socket and the plug constitute an on-off connection part of the multifunctional high-voltage connector, and the fuse constitutes a circuit protection part of the multifunctional high-voltage connector. Because the on/off connection part and the circuit protection part of the multifunctional high-voltage connector are separately provided, size and weight of the plug are independent of the fuse; when the on/off connection part of the multifunctional high-voltage connector needs to be closed or opened, it could have been only necessary to insert the plug into the socket or disconnect the plug from the socket. Therefore, based on a positional relationship among the fuse, the plug and the socket, the plug could have been small in size and light in weight, thereby it could have facilitated assembly between the plug and the socket, whereby it could have improved assembly efficiency of the battery product. When maintenance is needed for the battery product, the plug could have been simply directly unplugged from the socket. The operation could have been simple, time-saving and labor-saving, and maintenance efficiency could have been improved.

DETAILED DESCRIPTION

The multifunctional high-voltage connector and the battery product according to the present application will be described hereunder in detail with reference to the accompanying drawings.

Figure 1:
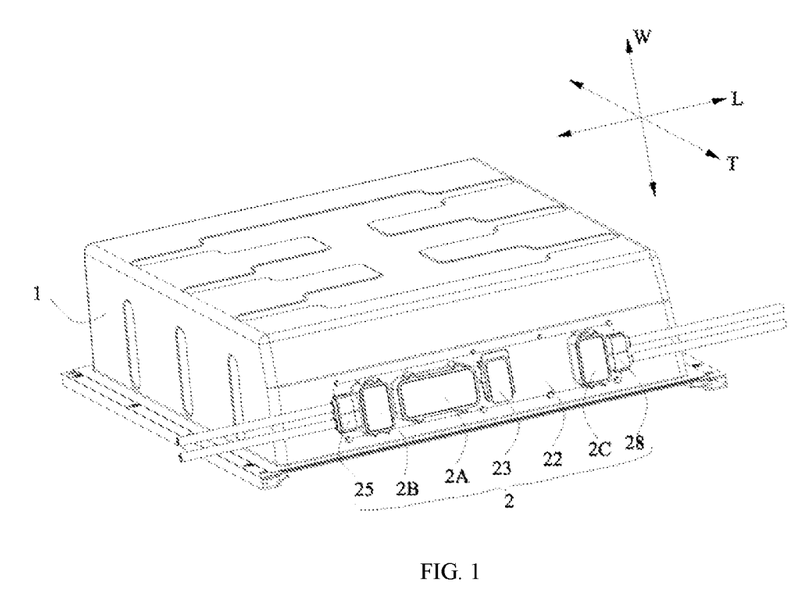
FIG. 1 is a perspective view of a battery product according to the present application.

With reference to FIG. 1, a battery product according to the present application includes a case body 1, a battery assembly (not shown) and a multifunctional high-voltage connector 2. The battery assembly is located inside the case body 1 and includes a first output pole and a second output pole. The multifunctional high-voltage connector 2 is fixedly mounted to the case body 1 and electrically connected to the battery assembly. The battery product may be a battery pack or a high-voltage box.

With reference to FIG. 2 to FIG. 12, the multifunctional high-voltage connector 2 may include a fuse 21, a socket 22, a plug 23, a first adapter piece 24, a first wiring harness assembly 25, a second adapter piece 26, a mounting base 27, a second wiring harness assembly 28, a first cover plate 2A, a second cover plate 2B, a third cover plate 2C, a sealing gasket 2D, a first sealing washer 2E, a second sealing washer 2F and a third sealing washer 2G.

Figure 2:
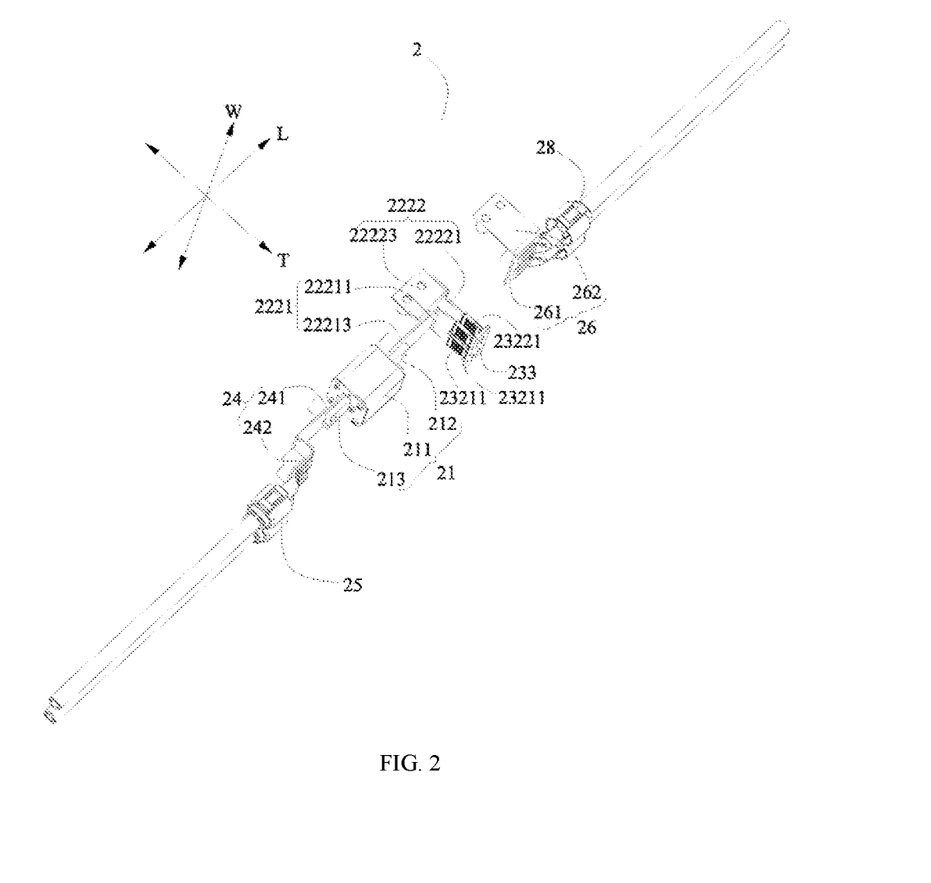
FIG. 2 is a schematic view of an electrical connection relationship of the multifunctional high-voltage connector in FIG. 1.

In order to achieve electrical connection between the inside and outside of the battery product, with reference to FIG. 2, the first output pole of the battery assembly is electrically connected to an other apparatus external to the battery product through the first wiring harness assembly 25 of the multifunctional high-voltage connector 2, and the second output pole is electrically connected to the other apparatus external to the battery product through the second wiring harness assembly 28 of the multifunctional high-voltage connector 2, whereby the first output pole and the second output pole of the battery assembly, the first wiring harness assembly 25 and the second wiring harness assembly 28 form a high-voltage connection circuit together with the other apparatus. The other apparatus may be another battery pack or high-voltage box.

With reference to FIG. 1, the socket 22 of the multifunctional high-voltage connector 2 is fixedly mounted to the case body 1, and the plug 23 is configured to insert into or disconnect from the socket 22 so as to control on-off of the high-voltage connection circuit.

Figure 3:
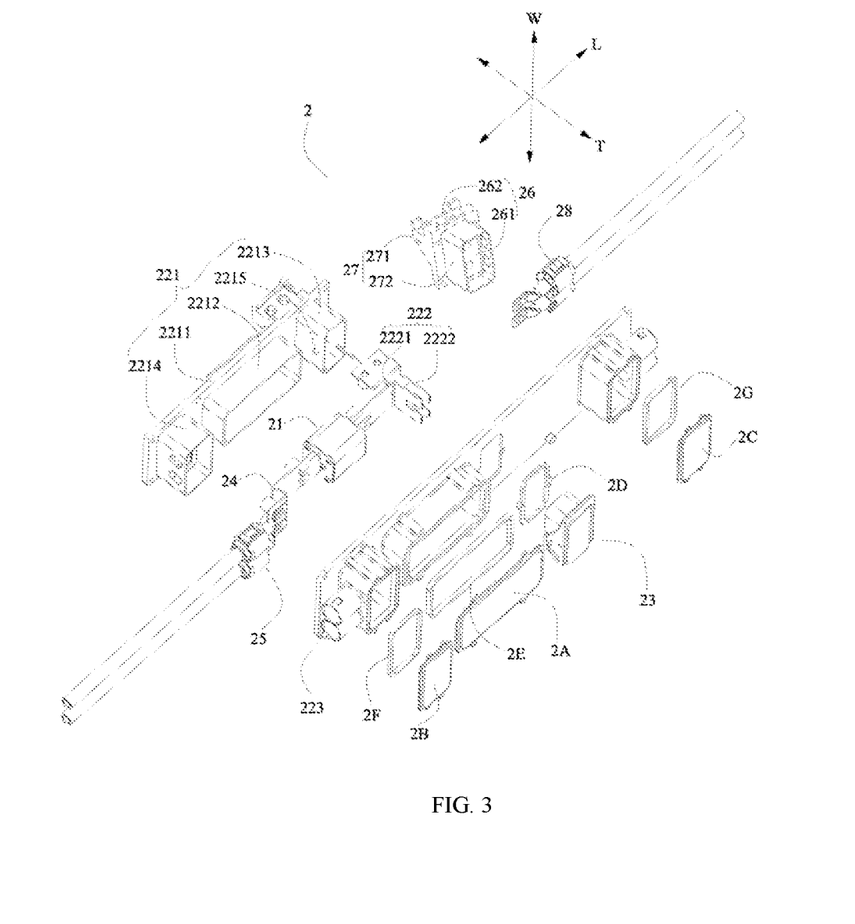
FIG. 3 is an exploded view of the multifunctional high-voltage connector in FIG. 1.
Figure 11:
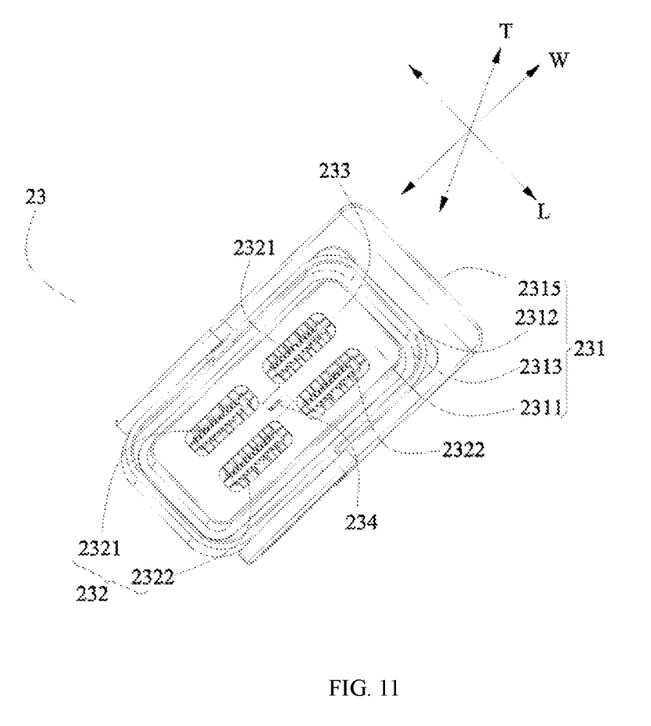
FIG. 11 is a perspective view of the plug of the multifunctional high-voltage connector of the present application.

With reference to FIG. 3, FIG. 6, FIG. 8 and FIG. 9, the socket 22 may include a base 221, a socket terminal 222, a mounting shell 223 and a first interlocking structure 224. With reference to FIG. 2, FIG. 3, and FIG. 11, the plug 23 may include a seat 231, a plug terminal 232, a connecting piece 233 and a second interlocking structure 234.

The base 221 of the socket 22 and the seat 231 of the plug 23 are made of an insulating material, the socket terminal 222 is fixedly mounted to the base 221, and the plug terminal 232 is fixedly mounted to the seat 231.

With reference to FIG. 3, FIG. 6, FIG. 8 and FIG. 9, the base 221 may include: a first main body portion 2211; a first accommodating portion 2212, protruding from the first main body portion 2211 in a thickness direction T; and a second accommodating portion 2213, protruding from the first main body portion 2211 in the thickness direction T and provided to be spaced from the first accommodating portion 2212 in a length direction L. The fuse 21 is fixed to the base 221 and accommodated in the first accommodating portion 2212, at least a part of the socket terminal 222 is accommodated in the second accommodating portion 2213, and the seat 231 of the plug 23 is inserted into the second accommodating portion 2213 of the base 221 in such a way that the plug terminal 232 is inserted into the socket terminal 222.

In the multifunctional high-voltage connector 2, the socket 22 and the plug 23 constitute an on-off connection part of the multifunctional high-voltage connector 2, and the fuse 21 constitutes a circuit protection part of the multifunctional high-voltage connector 2. The on-off connection part of the multifunctional high-voltage connector 2 controls on-off of the high-voltage connection circuit, and the circuit protection part renders overload protection on the high-voltage connection circuit.

Because the on/off connection part and the circuit protection part of the multifunctional high-voltage connector 2 are separately provided, size and weight of the plug 23 are independent of the fuse 21; when the on/off connection part of the multifunctional high-voltage connector 2 needs to be closed or opened, it is only necessary to insert the plug 23 into the socket 22 or disconnect the plug 23 from the socket 22. Therefore, based on a positional relationship among the fuse 21, the plug 23 and the socket 22, the plug 23 could have been small in size and light in weight, thereby it could have facilitated assembly between the plug 23 and the socket 22, whereby it could have improved assembly efficiency of the battery product. When maintenance is needed for the battery product, the plug 23 could have been directly unplugged from the socket 22. The operation could have been simple, time-saving and labor-saving, and maintenance efficiency could have been improved. In addition, because the assembly between the plug 23 and the socket 22 could have been simple, it could have helped to reduce a risk of electrical connection failure resulting from an improper operation.

With reference to FIG. 11, the seat 231 of the plug 23 may include: a second main body portion 2311 fixedly mounted to the plug terminal 232; and an outer shell 2312 located on a circumferential outer side of the second main body portion 2311 and forming an accommodating groove 2313 with the second main body portion 2311. When the on-off connection part of the multifunctional high-voltage connector 2 is closed, the second main body portion 2311 of the seat 231 is accommodated in the second accommodating portion 2213 of the base 221, and the peripheral wall of the second accommodating portion 2213 of the base 221 is accommodated in the accommodating groove 2313 of the seat 231.

Figure 12:
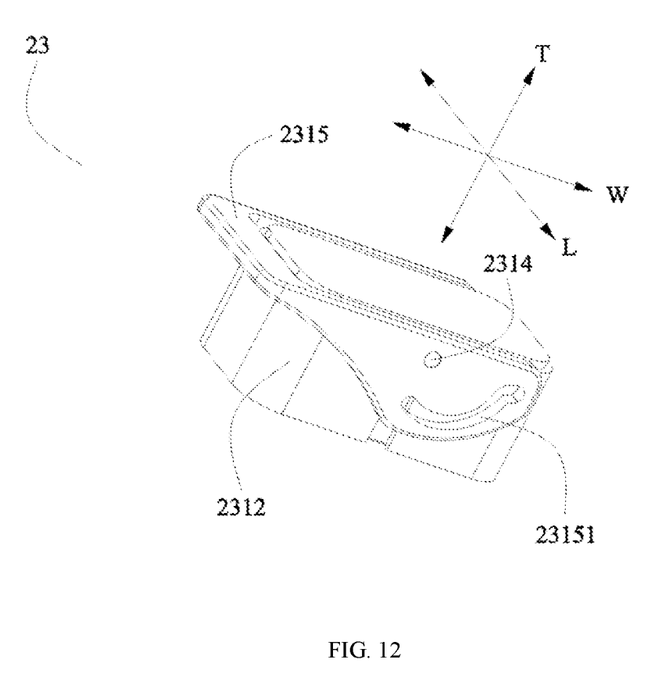
FIG. 12 is a back view of FIG. 11.

With reference to FIG. 11 and FIG. 12, the seat 231 may further include: a mounting post 2314 protruding from the outer shell 2312; and a rocker arm 2315 slidably connected to the mounting post 2314.

Figure 8:
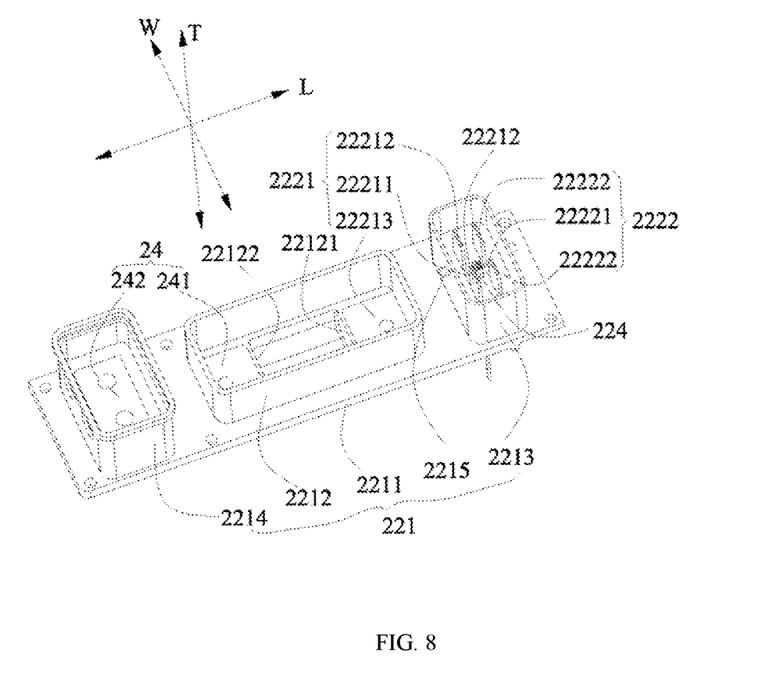
FIG. 8 is a perspective view of the multifunctional high-voltage connector in FIG. 7 with the mounting shell of the socket removed.

With reference to FIG. 3 and FIG. 8, the base 221 of the socket 22 may further include a guide post 2215 protruding from the outer surface of the second accommodating portion 2213. With reference to FIG. 12, the rocker arm 2315 may be provided with a guide groove 23151. When the rocker arm 2315 slides relative to the mounting post 2314, the guide post 2215 slides along the guide groove 23151.

Specifically, the guide groove 23151 may include a first end and a second end. After the plug 23 is fully inserted into the socket 22, in order to further fix the plug 23 to the socket 22, the rocker arm 2315 may be manually operated to slide the guide post 2215 to the first end of the guide groove 23151, at this point, the first end of the guide groove 23151 is engaged with the guide post 2215 to enable the guide post 2215 of the socket 22 to be fixed to the rocker arm 2315 of the plug 23; when there is a need to unplug the plug 23 from the socket 22, the rocker arm 2315 is first manually operated to slide the guide post 2215 to the second end of the guide groove 23151, at this point, a fixed connection between the rocker arm 2315 of the plug 23 and the guide post 2215 of the socket 22 is released, and then the plug 23 is simply unplugged from the socket 22.

With reference to FIG. 2, FIG. 3, and FIG. 6-FIG. 9, the socket terminal 222 may include: a first terminal 2221 connected to the fuse 21; and a second terminal 2222 provided to be spaced apart from the first terminal 2221. With reference to FIG. 2 and FIG. 11, the plug terminal 232 may include: a third terminal 2321 inserted into the first terminal 2221; and a fourth terminal 2322 inserted into the second terminal 2222 and connected to the third terminal 2321. A part of the second terminal 2222 of the socket terminal 222 extends into the case body 1 and is connected to the first output pole of the battery assembly to connect the multifunctional high-voltage connector 2 into the high-voltage connection circuit of the battery product.

Specifically, with further reference to FIG. 2, FIG. 3, and FIG. 6 to FIG. 7, the first terminal 2221 may include: a first holding portion 22211 (in an L-shaped structure) embedded in the first main body portion 2211 of the base 221; a first inserting portion 22212 accommodated in the second accommodating portion 2213; and a first connecting portion 22213 accommodated in the first accommodating portion 2212 and connected to the fuse 21. The second terminal 2222 may include: a second holding portion 22221 embedded in the first main body portion 2211 of the base 221; a second inserting portion 22222 accommodated in the second accommodating portion 2213; and a second connecting portion 22223 extending from the first main body portion 2211.

Figure 5:
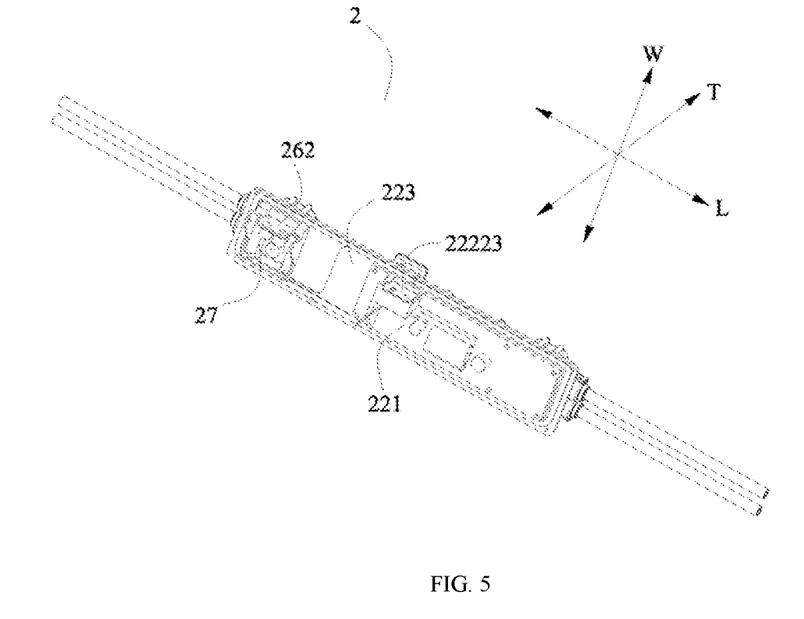
FIG. 5 is a back view of FIG. 4.

With reference to FIG. 5, the second connecting portion 22223 of the second terminal 2222 extends into the case body 1 and is connected to the first output pole of the battery assembly.

The third terminal 2321 is inserted into the first inserting portion 22212 of the first terminal 2221, and the fourth terminal 2322 is inserted into the second inserting portion 22222 of the second terminal 2222. The third terminal 2321 and the first inserting portion 22212 of the first terminal 2221 are consistent in number, and the fourth terminal 2322 and the second inserting portion 22222 of the second terminal 2222 are consistent in number.

It should be noted here that, based on the battery product's requirements on current in the high-voltage connection circuit, the number of the first inserting portion 22212 of the first terminal 2221 and the second inserting portion 22222 of the second terminal 2222 can be appropriately set.

With reference to FIG. 11, the third terminal 2321 and the fourth terminal 2322 are embedded in the second main body portion 2311 of the seat 231.

With reference to FIG. 2, the first inserting portion 22212 may be accommodated in the third terminal 2321, and the second inserting portion 22222 may be accommodated in the fourth terminal 2322. Specifically, the third terminal 2321 may include a first elastic clamping portion 23211 for clamping the first inserting portion 22212. The fourth terminal 2322 may include a second elastic clamping portion 23222 for clamping the second inserting portion 22222.

In order to achieve connection between the fourth terminal 2322 and the third terminal 2321, with reference to FIG. 2, the plug 23 may further include: a connecting piece 233 connected to both the fourth terminal 2322 and the third terminal 2321.

The mounting shell 223 of the socket 22 is fixedly mounted to the case body 1 outside the case body 1, the base 221 is fixedly mounted to the mounting shell 223 and at least a part of it is located inside the case body 1. Here, the mounting shell 223 renders insulation protection for the part of the multifunctional high-voltage connector 2 outside the case body 1, while the base 221 renders insulation protection for the part of the multifunctional high-voltage connector 2 inside the case body 1, whereby it could have contributed to improvement of reliability and safety of the battery product.

Figure 9:
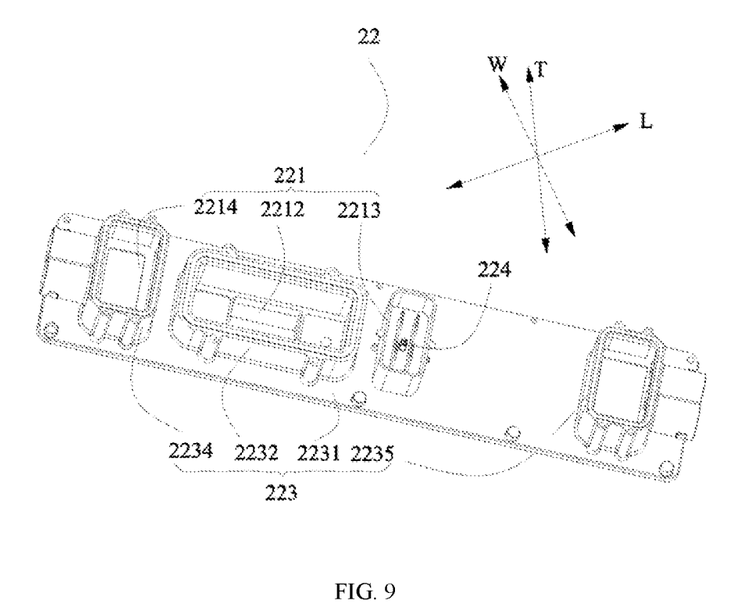
FIG. 9 is a perspective view of the socket of the multifunctional high-voltage connector of the present application.
Figure 10:
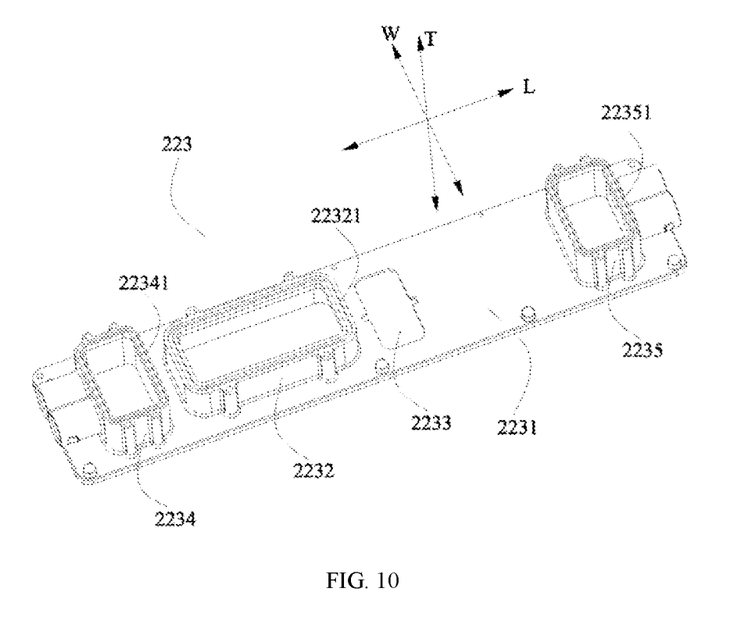
FIG. 10 is a perspective view of the mounting shell in FIG. 9.

With reference to FIG. 3 to FIG. 7 as well as FIG. 9 and FIG. 10, the mounting shell 223 may include: a third main body portion 2231; a first extending portion 2232 protruding from the third main body portion 2231 in the thickness direction T; and a through hole 2233 running through the third main body portion 2231 in the thickness direction T. The first accommodating portion 2212 of the base 221 is accommodated in the first extending portion 2232 of the mounting shell 223, and the second accommodating portion 2213 extends from the mounting shell 223 via the through hole 2233.

Figure 6:
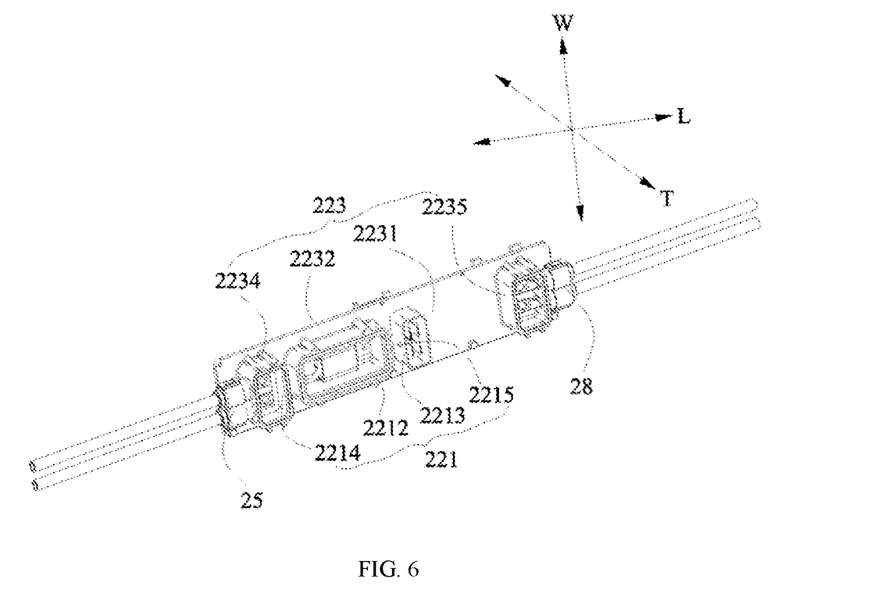
FIG. 6 is a perspective view of the multifunctional high-voltage connector in FIG. 4 with the plug, the first cover plate, the second cover plate and the third cover plate removed.
Figure 7:
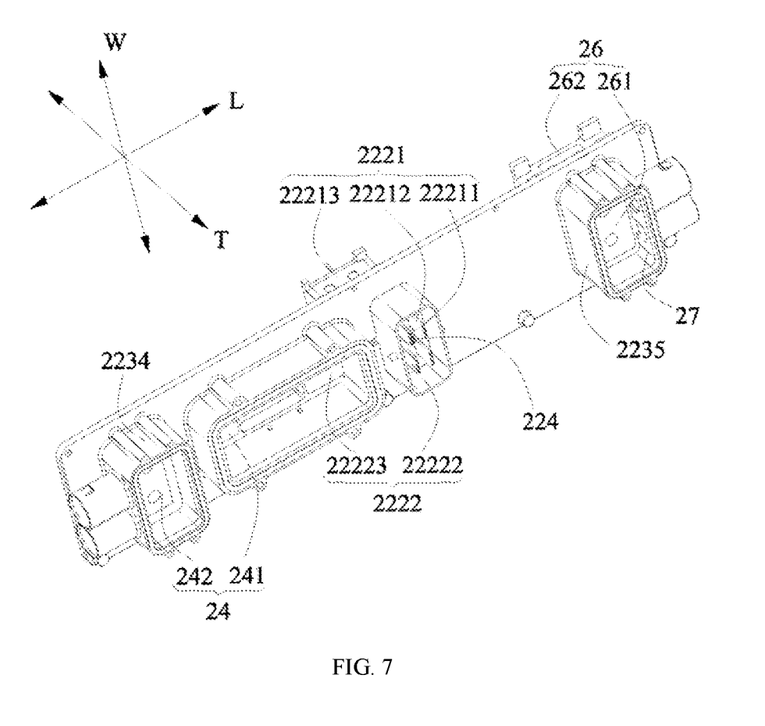
FIG. 7 is a perspective view of the multifunctional high-voltage connector in FIG. 6 with the first wiring harness assembly and the second wiring harness assembly removed.

With reference to FIG. 6 to FIG. 8, the base 221 may further include a third accommodating portion 2214 configured to be spaced apart from the first accommodating portion 2212 in the length direction L. The first adapter piece 24 is embedded in the first main body portion 2211 of the base 221, where a first end portion 241 of the first adapter piece 24 is located in the first accommodating portion 2212 and connected to the fuse 21, and a second end portion 242 of the first adapter piece 24 is located in the third accommodating portion 2214.

With reference to FIG. 6, FIG. 7 and FIG. 10, the mounting shell 223 may further include a second extending portion 2234 protruding from the third main body portion 2231 in the thickness direction T. The third accommodating portion 2214 of the base 221 is accommodated in the second extending portion 2234 of the mounting shell 223. The first wiring harness assembly 25 is fixed to the second extending portion 2234 of the mounting shell 223, and a part of the first wiring harness assembly 25 is located in the third accommodating portion 2214 of the base 221 for connection to the second end portion 242 of the first adapter piece 24.

With reference to FIG. 2 and FIG. 3, the fuse 21 may include: a fourth main body portion 211; a first protruding portion 212 formed at one end of the fourth main body portion 211 in the length direction L; and a second protruding portion 213 formed at the other end of the fourth main body portion 211 in the length direction L. The first protruding portion 212 of the fuse 21 is connected to the first connecting portion 22213 of the first terminal 2221, and the second protruding portion 213 is connected to the first end portion 241 of the first adapter piece 24. The base 221 can be formed by injection molding on the integration of the socket terminal 222, the fuse 21 and the first adapter piece 24 that have finished to be connected.

With reference to FIG. 8, the first accommodating portion 2212 may be provided with: a first boss 22121; and a second boss 22122 provided to be spaced apart from the first boss 22121. The fourth main body portion 211 of the fuse 21 is located between the first boss 22121 and the second boss 22122, the first protruding portion 212 is located on the first boss 22121, and the second protruding portion 213 is located on the second boss 22122.

Figure 4:
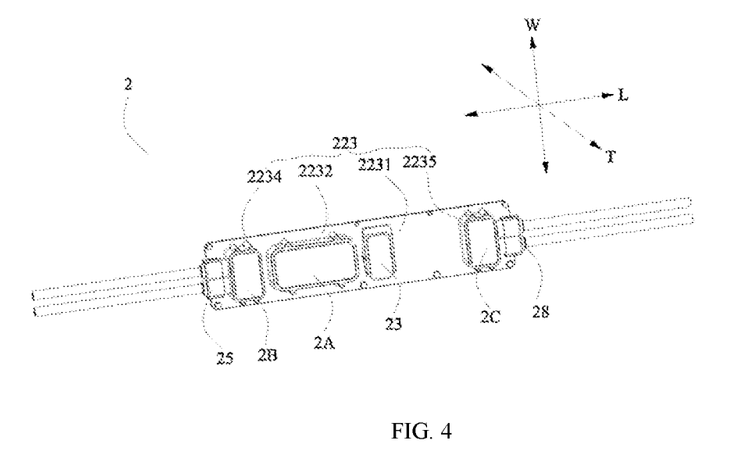
FIG. 4 is an assembly view of FIG. 3.

With reference to FIG. 10, the first extending portion 2232 of the mounting shell 223 may be provided with a first groove 22321. With reference to FIG. 3 and FIG. 4, the first cover plate 2A is assembled to the first extending portion 2232, and the first sealing washer 2E is accommodated in the first groove 22321 and connects the first cover plate 2A and the first extending portion 2232 in a sealing way.

With reference to FIG. 10, the second extending portion 2234 of the mounting shell 223 may be provided with a second groove 22341. With reference to FIG. 3 and FIG. 4, the second cover plate 2B is assembled to the second extending portion 2234, and the second sealing washer 2F is accommodated in the second groove 22341 and connects the second cover plate 2B and the second extending portion 2234 in a sealing way.

With reference to FIG. 3, FIG. 6 and FIG. 7, the mounting base 27 is fixed to the mounting shell 223, and the second adapter piece 26 is mounted to the mounting base 27.

Specifically, with reference to FIG. 3, the mounting base 27 may include: a fifth main body portion 271; and a fifth accommodating portion 272 protruding from the fifth main body portion 271 in the thickness direction T. The second adapter piece 26 is embedded in the fifth main body portion 271 of the mounting base 27, the third end portion 261 of the second adapter piece 26 is located in the fifth accommodating portion 272, and the fourth end portion 262 of the second adapter piece 26 is located outside the fifth main body portion 271. Moreover, a part of the fifth main body portion 271 of the mounting base 27 is located in the case body 1 in such a way that the fourth end portion 262 of the second adapter piece 26 is connected to the second output pole of the battery assembly.

With reference to FIG. 6, FIG. 7, and FIG. 10, the mounting shell 223 may further include a third extending portion 2235 protruding from the third main body portion 2231 in the thickness direction T. The fifth main body portion 271 of the mounting base 27 is located on a side where the third main body portion 2231 of the mounting shell 223 faces away from the third extending portion 2235, and the fifth accommodating portion 272 is accommodated in the third extending portion 2235. The second wiring harness assembly 28 is fixed to the third extending portion 2235 of the mounting shell 223, and a part of the second wiring harness assembly 28 is located in the fifth accommodating portion 272 of the mounting base 27 for connection to the third end portion 261 of the second adapter piece 26.

With reference to FIG. 10, the third extending portion 2235 of the mounting shell 223 may be provided with a third groove 22351. The third cover plate 2C is assembled to the third extending portion 2235, and the third sealing washer 2G is accommodated in the third groove 22351 and connects the third cover plate 2C and the third extending portion 2235 in a sealing way.

With reference to FIG. 8 and FIG. 9, the first interlocking structure 224 is fixedly mounted to the base 221 and connected into a battery management system (BMS) of the battery product. With reference to FIG. 11, the second interlocking structure 234 is fixedly mounted to the seat 231; when the seat 231 is inserted into the second accommodating portion 2213 of the base 221, the second interlocking structure 234 is inserted into the first interlocking structure 224, at this point, the second interlocking structure 234, the first interlocking structure 224 and the BMS form a low-voltage interlocking circuit. The low-voltage interlocking circuit could have functioned to protect the high-voltage connection circuit of the battery product, whereby it could have ensured reliability and safety of the battery product.

With reference to FIG. 3, the sealing gasket 2D is provided between the seat 231 of the plug 23 and the third main body portion 2231 of the mounting shell 223 to connect the plug 23 and the socket 22 in a sealing way.

It should be noted here that because the on-off connection part and the circuit protection part of the multifunctional high-voltage connector 2 are separately provided, the on-off connection part (sealed by the sealing gasket 2D) and the circuit protection part (sealed by the first cover plate 2A and the first sealing washer 2E) are sealed respectively and separately, whereby it could have reduced respective sealing surfaces and greatly improved sealing effects.

What is claimed is:

1. A multifunctional high-voltage connector, comprising:
a fuse;
a socket comprising:
a base; and
a socket terminal fixedly mounted to the base;
a plug comprising:
a seat; and
a plug terminal fixedly mounted to the seat;
wherein:
the base comprises: a first main body portion; a first accommodating portion protruding from the first main body portion in a thickness direction; and a second accommodating portion protruding from the first main body portion in the thickness direction and provided to be spaced apart from the first accommodating portion in a length direction;
the fuse is accommodated in the first accommodating portion, at least a part of the socket terminal is accommodated in the second accommodating portion, and the seat of the plug is inserted into the second accommodating portion of the base in such a way that the plug terminal is inserted into the socket terminal.

2. The multifunctional high-voltage connector according to claim 1, wherein:
the socket terminal comprises: a first terminal connected to the fuse; and a second terminal provided to be spaced apart from the first terminal; and
the plug terminal comprises: a third terminal inserted into the first terminal; and a fourth terminal inserted into the second terminal and connected to the third terminal.

3. The multifunctional high-voltage connector according to claim 2, wherein:
the first terminal comprises: a first holding portion embedded in the first main body portion of the base; a first inserting portion accommodated in the second accommodating portion; and a first connecting portion accommodated in the first accommodating portion and connected to the fuse;
the second terminal comprises: a second holding portion embedded in the first main body portion of the base; a second inserting portion accommodated in the second accommodating portion; and a second connecting portion extending from the first main body portion; and
the third terminal is inserted into the first inserting portion of the first terminal, and the fourth terminal is inserted into the second inserting portion of the second terminal.

4. The multifunctional high-voltage connector according to claim 3, wherein:
the first inserting portion is accommodated in the third terminal, and the second inserting portion is accommodated in the fourth terminal;
the third terminal comprises a first elastic clamping portion for clamping the first inserting portion; and
the fourth terminal comprises a second elastic clamping portion for clamping the second inserting portion.

5. The multifunctional high-voltage connector according to claim 1, wherein:
the socket further comprises a mounting shell;
the mounting shell comprises: a third main body portion; a first extending portion protruding from the third main body portion in the thickness direction; and a through hole running through the third main body portion in the thickness direction; and
the first accommodating portion of the base is accommodated in the first extending portion of the mounting shell, and the second accommodating portion extends from the mounting shell via the through hole.

6. The multifunctional high-voltage connector according to claim 5, wherein:
the base further comprises: a third accommodating portion provided to be spaced apart from the first accommodating portion in the length direction; and
the multifunctional high-voltage connector further comprises: a first adapter piece embedded in the first main body portion of the base, wherein a first end portion of the first adapter piece is located in the first accommodating portion and connected to the fuse, and a second end portion of the first adapter piece is located in the third accommodating portion; and a first wiring harness assembly fixed to the mounting shell of the socket, wherein a part of the first wiring harness assembly is located in the third accommodating portion of the base and connected to the second end portion of the first adapter piece.

7. The multifunctional high-voltage connector according to claim 6, wherein the multifunctional high-voltage connector further comprises: a second adapter piece; a mounting base mounted with the second adapter piece and fixed to the mounting shell; and a second wiring harness assembly fixed to the mounting shell and connected to the second adapter piece.

8. The multifunctional high-voltage connector according to claim 7, wherein:
the mounting base comprises: a fifth main body portion; and a fifth accommodating portion protruding from the fifth main body portion in the thickness direction;
the second adapter piece is embedded in the fifth main body portion, a third end portion of the second adapter piece is located in the fifth accommodating portion, and a fourth end portion of the second adapter piece is located outside the fifth main body portion; and
a part of the second wiring harness assembly is located in the fifth accommodating portion of the mounting base and connected to the third end portion of the second adapter piece.

9. A battery product, comprising:
a case body; and
a battery assembly accommodated in the case body;
wherein the battery product further comprises the multifunctional high-voltage connector according to claim 1, the socket of the multifunctional high-voltage connector is fixedly mounted to the case body, and at least a part of the socket terminal of the socket extends into the case body and is connected to the battery assembly.

10. The battery product according to claim 9, wherein:
the battery assembly comprises a first output pole and a second output pole;
the multifunctional high-voltage connector further comprises: a second adapter piece; and a second wiring harness assembly connected to the second adapter piece; and
the first output pole of the battery assembly is connected to the socket terminal, and the second output pole is connected to the second adapter piece.

* * * * *